United States Patent [19]

Fry et al.

[11] Patent Number: 4,763,944
[45] Date of Patent: Aug. 16, 1988

[54] TAILGATE BARRIERS

[76] Inventors: Steven A. Fry, 30052 Running Deer La., Laguna Niguel, Calif. 92677; Rodney L. Stafford, 4900 E. Chapman #13, Orange, Calif. 92669

[21] Appl. No.: 37,315

[22] Filed: Apr. 13, 1987

[51] Int. Cl.⁴ .............................................. B62D 25/00
[52] U.S. Cl. ....................................... 296/50; 296/1 S
[58] Field of Search ................................... 296/50, 1 S

[56] References Cited

U.S. PATENT DOCUMENTS 3,148,912 9/1964 Curtis et al. ........................... 296/50
4,136,905 1/1979 Morgan .................................. 296/50
4,353,589 10/1982 Hartberg .............................. 296/50

Primary Examiner—Robert R. Song
Attorney, Agent, or Firm—Donald D. Mon

[57] ABSTRACT

A tailgate barrier for a light truck comprising a flat membrane of flexible, inelastic material. Apertures are formed through the membrane to pass air therethrough. Stiffeners are incorporated in the membrane at its side edges to maintain the side edge straight, and to distribute the tensioning forces which hold the barrier in place.

22 Claims, 2 Drawing Sheets

TAILGATE BARRIERS

FIELD OF THE INVENTION

This invention relates to tailgate barriers for the bed of a pickup truck, intended to replace the conventional solid tailgate.

BACKGROUND OF THE INVENTION

Smaller trucks, such as light pickup and sport trucks, have an open bed with solid sides and a hinged solid metal tailgate. The tailgate is lowered for loading and unloading operations, and is fixed in a vertical position for running operations. An objective of this tailgate is to prevent persons and objects from falling off the rear of the truck bed. When the truck is running these tailgates exert a substantial parasitic aerodynamic drag. Their substantial weight and their parasitic drag combine to reduce the attainable speed of the vehicle, especially of smaller trucks with less powerful engines, and decrease the attainable mileage per gallon of fuel.

The above disadvantages have long been widely recognized. In response, a market has developed in nets to replace the solid barriers. These can stop many or most articles and persons from falling out, and parasitic drag is greatly reduced or minimized. There are, however, shortcomings in the known nets which have led to higher prices, poor appearance, noisiness, and accelerated wear. Even so, a considerable demand exists for even these products because of the advantages they provide, especially their lesser weight and their lesser parasitic drag.

The existing tailgate nets suffer from several widely recognized problems. For example, they are not self-supporting in any way and rely on tension created by elastic inlays or the tensioning of individual horizontal webbing straps to try to create a flat tailgate shape. Without exception, these methods of tensioning produce very uneven results, such as bagging and sagging, as well as considerable high frequency flutter and flapping (with resulting noise) when the vehicle is in motion. The dynamic actions of these unbalanced systems further contribute to widely experienced tearing and rapid wear. The multiple individual attach points which are the characteristic feature of such nets are the only structural interconnection between strands that extend in one direction and strands that extend in another direction. Therefore unless every strand is equally tensioned, there will necessarily be an out-of-plane sag or distortion. Such even-ness of tensioning is most unlikely to be attained, and the consequence is a sloppy appearance, and the dynamic problems just described. In addition, these fabric nets have no hardpoints which can allow the attachment of an integral anti-theft device. The tailgate net has an industry-wide and consumer-wide reputation for quick and easy theft. All of these problems have been consistent and recognized from the inception of the product concept. It is an object of this invention to overcome them.

BRIEF DESCRIPTION OF THE INVENTION

A tailgate barrier according to this invention comprises a single piece web-type membrane apertured to permit the flow of air through its apertures. The membrane material is flexible and substantially inelastic in all dimensions, and is internally reinforced, such as by multiple weavings integrated in a plastic matrix, which serves to stabilize the membrane in its own plane. The membrane can therefore be tensioned without substantial change of shape, and thereby avoids the bagging and sagging which are generally encountered by prior art devices. To assist in the tensioning and to assure even tension along the edge of the membrane, stiffener means is incorporated into its vertical edges. Attachment straps connectable to the truck provide for attachment to the side walls of the truck.

According to a preferred but optional feature of this invention, the density of apertures at lower elevations nearer the truck bed is less than the density farther above it. At the lower level there is a greater need for strength and a lesser need for apertures than at upper levels. This is because the air speed next to the deck is slower than at levels higher above the deck, so that less membrane area needs to be removed to enable adequate flow to occur. This improves greater mechanical strength of the barrier near the bottom where moving objects most usually are restrained.

According to yet another preferred but optional feature of the invention, the membrane includes strands which cross one another, and are embedded in an organic plastic matrix which stabilizes the strands.

The above and other features of this invention will be fully understood from the following detailed description of the invention and the accompanying drawings in which:

DETAILED DESCRIPTION OF THE INVENTION

Figure 1:
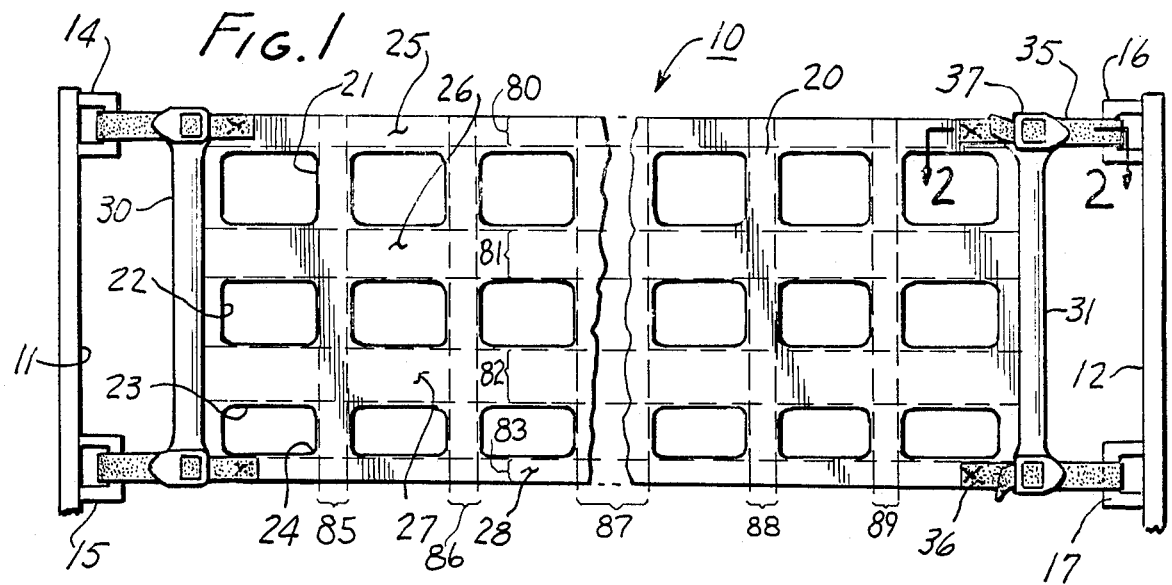
FIG. 1 is an elevation of the presently preferred embodiment of the invention.

In FIG. 1 there is shown a tailgate barrier 10 according to the invention adapted to be stretched between the side walls 11,12 of a truck and above the truck bed. Hard attach points 14, 15, 16, 17, for example metal loops, are provided on the truck for attachment purposes.

The barrier itself comprises a membrane 20 of flexible substantially inelastic sheet material, inelastic and flexible in all dimensions. A plastic coated woven nylon sheet is an example of a suitable material.

The preferred material is a cross-woven fabric with strands arranged across the barrier and from top to bottom. They may be interconnected by knitting, knotting, or other techniques, woven in an over-and-under pattern, or simply laid atop one another, as preferred. Then the strands are embedded in a plastic matrix, perhaps polyvinyl chloride. This embedment stabilizes the strands at their junctions or interconnections and also spaces their joinders or junctions apart from one another. The effect of this arrangement is to provide a sheet which is inherently stabilized against localized out-of-plane distortions. Certainly any resulting waves or distortions are much reduced in scope or scale from those evidenced by string-type nets.

Apertures 21, 22, 23, are shown in horizontal sets. For reasons which will later be disclosed, the density of apertures in the sense of total open area at a lower level is less than the density at upper levels. In the preferred embodiment the apertures will be principally rectangular with rounded corners such as at corner 24. The rounded corners facilitate the die cutting of the material and also reduce stress concentrations at the corners which could lead to tearing of notch-sensitive materials.

The apertures form openings that leave substantial areas of cross-linked strands in a reinforcing matrix. These areas are in horizontal bands 80, 81, 82, 83, and vertical bands 85, 86, 87, 88, and 89. The term "band" as used herein means a continuous imperforate area of substantial width and height extending from side to side for a horizontal band, and from top to bottom for a vertical band. For illustrative purposes, dashed line in the drawings indicate horizontal boundaries for horizontal bands and vertical boundaries for vertical bands, within which the bands extend from side to side, or from top to bottom, respectively. When stretched by reasonably evenly distributed forces at the vertical edges there results a sensibly planar and stable apertured membrane which resists out-of-plane localized distortions. This arrangement with both horizontal and vertical bands will generally be found to be superior to staggered patterns of apertures, although staggered patterns are also within the scope of this invention wherein the uninterrupted bands would extend only either horizontally or vertically. Also it is within the scope of this invention for the density of the apertures to be substantially equal from top to bottom or even for the aperture density to be greater at the bottom than at the top, and for various of the apertures to have different shapes and sizes.

Figure 2:
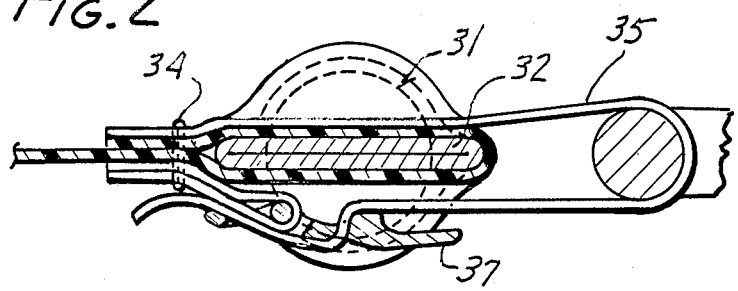
FIG. 2 is a fragmentary cross-section taken at line 2—2 in FIG. 1.

For mounting purposes stiffener means 30, 31 is provided at each side. In this embodiment this means comprises rigid rods. The term "rigid" as used herein means that the stiffener means will not bend appreciably under normal loads expected to be encountered. Thus, the rods need not be made of metal, although they usually will be. Polyvinyl chloride tubing of adequate cross-section dimensions and hardness could also be used, for example, even though it may bend somewhat under relatively high bending loads where a metal tube or rod might not. As best shown in FIG. 2, the rods are preferably formed of hollow tubing flattened at their two ends to form tongues 32 at the top and bottom. The membrane is wrapped around the rods from top to bottom and is stitched in place, such as by stitching 34 or cementing so as tightly to enclose the rod, and in effect continuously to connect the membrane to it. At the ends where the tube is flattened to form the tongues, mounting straps 35 are attached to the membrane. These mounting straps are secured to the membrane such as by stitches 36. A buckle 37 is also stitched to the barrier at this point. Accordingly the strap can be passed through the attach points and back to and through the buckle for the purpose of mounting and tensioning the membrane. When the membrane is installed it is only necessary to tighten the straps, which will pull the rods at both ends of the rods, and pull the membrane against it. The rods will distribute the pulling stress over the membrane from top to bottom. The rod stiffens the edges of the barrier so this distribution of stress occurs. It also serves to space the upper and lower edges apart, and reduces flutter at the side edges.

The illustrated stiffener means merits further comment. At its center it is a circular tube with, of course, an established circumference. When flattened at its ends, the flattened ends, although wider and narrower (see FIG. 2) have the same circumference. Accordingly the web material can be evenly wrapped around the stiffener means from end to end. In a stitched construction, the seam line 34 is surprisingly close to a straight line from end to end, and the web makes a close embracement with it. Importantly, however, the flattening at the ends enables the buckles to fit reasonably close to the plane of the web, making for a neater looking product. The length of the flattened portions will approximate the width of the buckles. This arrangement enables the mounting means (including the buckles) to be placed within the vertical extent of the web.

Figure 7:
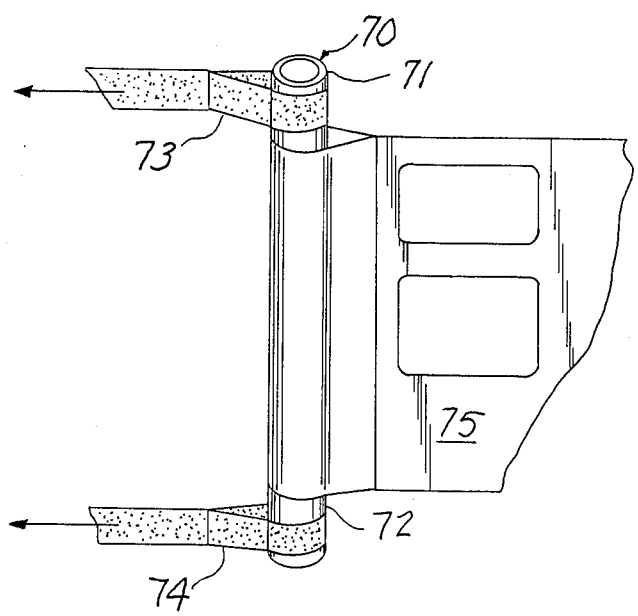
FIG. 7 is a fragmentary elevation view of another embodiment of the invention.

It is not necessary that the stiffener means be entirely contained inside the web material, but it does result in an article that is attractive and compact. Instead, as shown in FIG. 7, the stiffener means could be a tube 70 which has its ends 71, 72 projecting above and below the upper and lower margins of the web, where the projecting ends can be engaged by straps 73, 74. This is a useful barrier with the same advantage as the other embodiments, but is less attractive because of the projecting ends of the tubes. As before, the tube is embraced closely in a stitched fold of the material 75.

Figure 4:
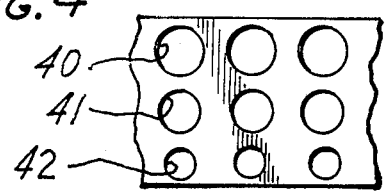
FIG. 4 is a schematic showing of another set of apertures.

FIG. 4 illustrates that apertures 40, 41, 42, may be other than rectangular. In this case they are circular, with different aperture densities as discussed above.

Figure 3:
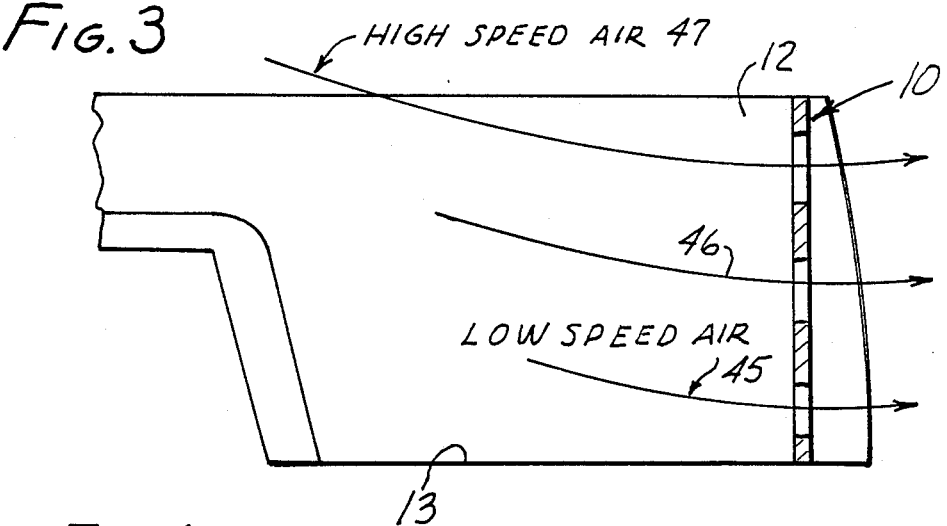
FIG. 3 is a schematic view showing air flow past the barrier.

The reason for the variation in the densities from bottom to top is shown in FIG. 3. Closer to the bed the air passes at a relatively slow speed as exemplified by arrow 45. At upper levels as exemplified by arrows 46 and 47 the air has higher speeds, and it is at these upper levels where there needs to be a greater density of aperture than at the lower levels to pass the air mass.

However, this is a fortuitous matter because objects which may tend to roll on or fall off of the truck bed are on the truck bed itself, and there is a greater strength of the membrane at lower levels than at the higher levels where these must be restrained.

The enclosed, stitched-in-place rod shown in FIGS. 1 and 2 is the preferred embodiment because the metal is hidden from view, and the metal rod is an excellent stiffener and distributor of the stresses. Instead of attaching the straps to the membrane, they could instead be attached to the rods. However, with proper manufacture, the straps will quickly bring the membrane against the rod at least at its ends, and then pull the rod against the membrane in the loop along the full length of the edge.

Thus, stiffener means as provided in this invention distribute the tension load along the side edges of the membrane and prevent the edges from sagging by maintaining the height at the edges.

Figure 5:
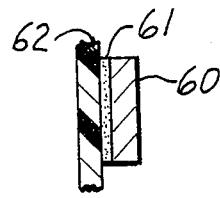
FIGS. 5 and 6 are fragmentary cross-sections of other forms of stiffener means.
Figure 6:
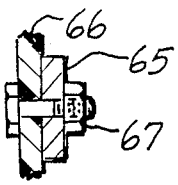

Other stiffener means can instead be provided which may for some units be preferred. For example, FIG. 5 shows a metal strip 60 bonded by a layer 61 of cement along the edge of a membrane 62. FIG. 6 shows a metal strip 65 attached along the edge of a membrane 66 by fastener 67 such as rivets or nut-bolt combinations. In both of these embodiments, the strip extends from top to bottom of the edges, or nearly to them. The straps may be attached to these strips or to the membrane as preferred.

Because this membrane is a single continuous sheet and is mounted for an even exertion of tension along its edges, it tends to retain a flat two dimensional shape in use. It will not tend to sag or bag or to yield at any particular level or location. Because there are no loose straps and the like to vibrate, noise is considerably reduced.

With the use of this membrane, there is a noticeable increase in mileage and attainable speed of the vehicle as compared with a solid tailgate. This provides a very strong and very attractive tailgate barrier.

This invention is not to be limited by the embodiments shown in the drawings and described in the description which are given by way of example and not of limitation, but only in accordance with the scope of the appended claims.

We claim:

1. A tailgate barrier to be suspended between the rear ends of sidewalls of an open bed of a truck comprising a flexible, substantially inelastic sheet having a top edge, a bottom edge and two side edges, said sheet having a plurality of apertures therethrough between its edges; stiffener means incorporated into each side edge reinforcing said respective side edges to prevent their sagging, and to apply tension force to said flexible sheet along most of the length of the respective side edge; and
   a pair of tensioning means attached to the barrier adjacent to its top and bottom and attachable to said sidewall to exert tension forces normal to said side edges whereby to draw the barrier tightly across the face of said open end.

2. A tailgate barrier according to claim 1 in which said stiffener means comprises a rigid rod enclosed within a fold at the respective side edge.

3. A tailgate barrier according to claim 2 in which said rod is a tubing flattened at both ends to accommodate said tensioning means.

4. A tailgate barrier according to claim 1 in which said stiffener means is a rigid elongated member attached to said membrane adjacent to a respective side edge.

5. A tailgate barrier according to claim 4 in which said elongated member is cemented to said member.

6. A tailgate barrier according to claim 4 in which said elongated member is fastened to said membrane by fasteners.

7. A tailgate barrier according to claim 1 in which the material of the sheet comprises crossed strands incorporated in an organic plastic matrix.

8. A tailgate barrier according to claim 1 in which said apertures are generally rectangular, with straight vertical and horizontal edges, and round corners.

9. A tailgate barrier according to claim 8 in which said stiffener means comprises a rigid rod enclosed within a fold at the respective side edge.

10. A tailgate barrier according to claim 8 in which said apertures are provided in parallel horizontal sets.

11. A tailgate barrier according to claim 1 in which the sheet includes a plurality of parallel bands of material without apertures in said bands, said bands extending between a pair of parallel said edges.

12. A tailgate barrier according to claim 11 in which said parallel bands are horizontal, extending between said side edges.

13. A tailgate barrier according to claim 12 in which said apertures are provided in parallel horizontal sets between horizontal bands.

14. A tailgate barrier according to claim 13 in which the aperatures of an upper set occupy a larger total area than the apertures in a lower set.

15. A tailgate barrier according to claim 11 in which said parallel bands are vertical, extending between said top and bottom edges.

16. A tailgate barrier according to claim 15 in which some of said parallel bands are horizontal, extending between said side edges.

17. A tailgate barrier according to claim 15 in which said apertures are provided in parallel vertical sets.

18. A tailgate barrier according to claim 17 in which said apertures are also provided in parallel horizontal sets.

19. A tailgate barrier according to claim 17 in which at least one upper aperture has a larger area than at least one lower aperture in a respective set.

20. A tailgate barrier according to claim 11 in which the material of the sheet includes strands incorporated in an organic plastic matrix in said bands, extending in the direction of said bands.

21. A tailgate barrier according to claim 20 in which said strands extend both vertically and horizontally, between respective parallel edges.

22. A tailgate barrier according to claim 20 in which said apertures are provided in parallel horizontal sets.

* * * * *